United States Patent
Fanning et al.

(10) Patent No.: US 7,725,751 B2
(45) Date of Patent: May 25, 2010

(54) TERMINATION TECHNIQUES FOR BUS INTERFACES

(75) Inventors: Blaise Fanning, Folsom, CA (US); Binta M. Patel, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 11/618,496

(22) Filed: Dec. 29, 2006

(65) Prior Publication Data

US 2008/0162962 A1 Jul. 3, 2008

(51) Int. Cl.
*G06F 1/00* (2006.01)

(52) U.S. Cl. .................. 713/324; 713/300; 713/320

(58) Field of Classification Search ............... 713/300, 713/320, 324
See application file for complete search history.

(56) References Cited

U.S. PATENT DOCUMENTS

| | | | | |
|---|---|---|---|---|
| 6,243,817 B1 * | 6/2001 | Melo et al. | .................. | 713/300 |
| 6,970,951 B2 * | 11/2005 | Cheung et al. | .................. | 710/14 |
| 7,418,614 B2 * | 8/2008 | Shirotori | .................... | 713/500 |
| 2007/0157042 A1 * | 7/2007 | Jahagirdar et al. | .......... | 713/320 |

* cited by examiner

*Primary Examiner*—Thomas Lee
*Assistant Examiner*—Jaweed A Abbaszadeh
(74) *Attorney, Agent, or Firm*—Kacvinsky LLC

(57) ABSTRACT

Techniques involving the transfer of signals across interconnection media are disclosed. For instance, an apparatus may include an apparatus having an interconnection medium, a first device that may drive the interconnection medium, and a second device. The second device may include a pull-up resistor that is selectively coupled between the interconnection medium and a power source. For instance, the second device may disconnect a power source from the interconnection medium when the first device is in a power saving operational state. Otherwise, the pull-up resistance is coupled between the power source and the interconnection medium.

19 Claims, 4 Drawing Sheets

TERMINATION TECHNIQUES FOR BUS INTERFACES

BACKGROUND

Many devices include multiple electronic components that exchange information with each other. Such information may be exchanged across interconnection media in the form of electrical signals. For example, interfaces known generally as buses may distribute information between components of a computer.

Moreover, as the trend toward advanced central processing units (CPUs) with more transistors and higher frequencies continues to grow, computer designers and manufacturers are often faced with corresponding increases in power and energy consumption. Furthermore, manufacturing technologies that provide faster and smaller components can at the same time result in increased leakage power. Particularly in mobile computing environments, increased power consumption can lead to overheating, which may negatively affect performance, and can significantly reduce battery life. Because batteries typically have a limited capacity, running the processor of a mobile computing system more than necessary could drain the capacity more quickly than desired.

Thus, systems may attempt to conserve power by placing processors in various power states based on various operating characteristics. Such operational states may have a corresponding impact on the behavior of coupled interconnection media, such as buses.

DETAILED DESCRIPTION

Various embodiments may be generally directed to techniques involving the transfer of signals across interconnection media. For instance, in embodiments, an apparatus may include an apparatus having an interconnection medium, a first device that may drive the interconnection medium, and a second device. The second device may include a pull-up resistor that is selectively coupled between the interconnection medium and a power source. For instance, the second device may disconnect a power source from the interconnection medium when the first device is in a power saving operational state. Otherwise, the pull-up resistance is coupled between the power source and the interconnection medium.

As described herein, embodiments may advantageously provide for reduced power consumption. In addition, embodiments may provide for reduced heat dissipation.

Embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1A:
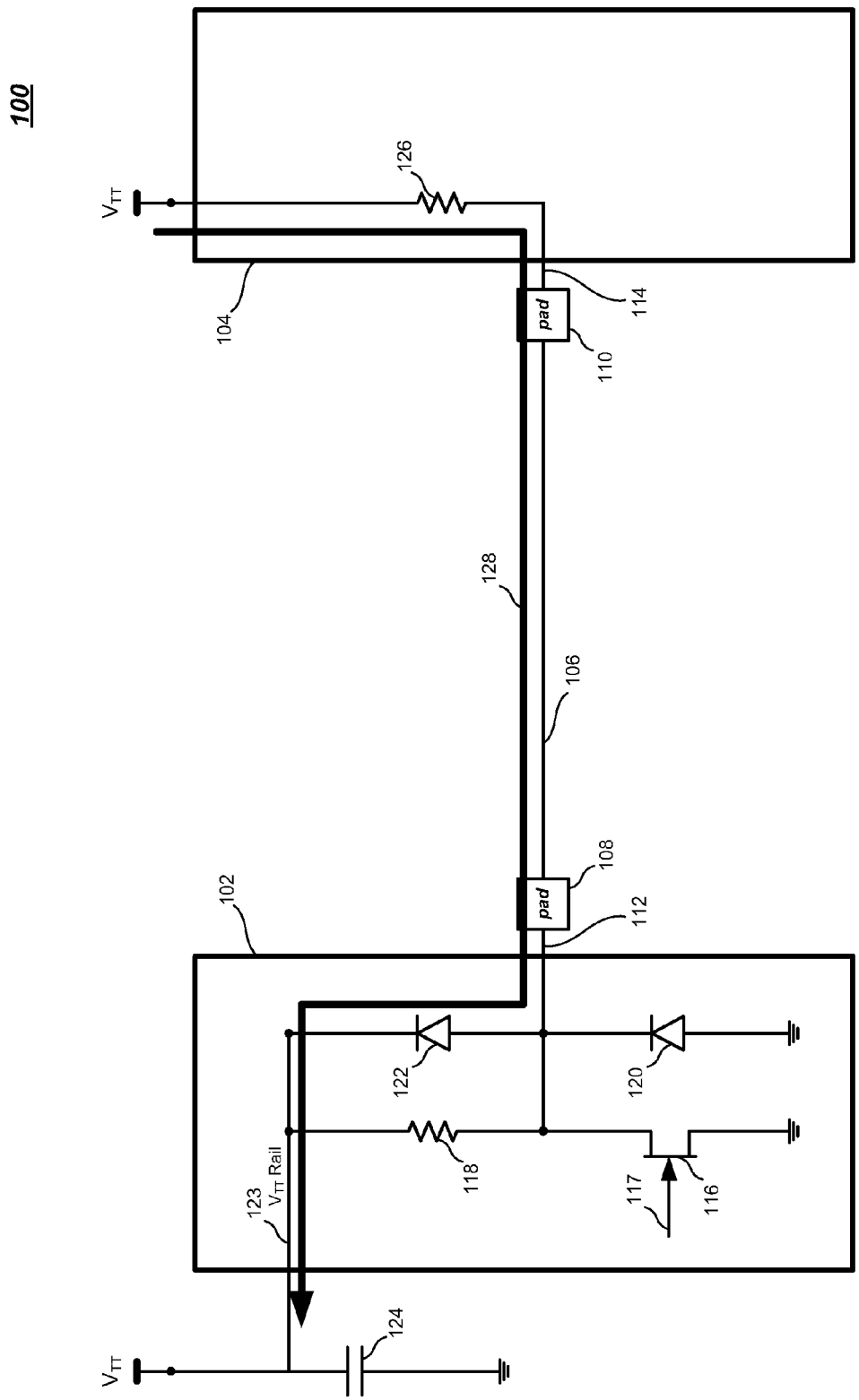
FIGS. 1A and 1B illustrate apparatus embodiments.

FIG. 1A illustrates one embodiment of an apparatus that may transfer signals across an interconnection medium. In particular, FIG. 1A shows an apparatus 100 comprising various elements. The embodiments, however, are not limited to these depicted elements. As shown in FIG. 1A, apparatus 100 may include a device 102, a device 104, and an interconnection medium 106.

Apparatus 100 may be implemented in a computer system. For instance, device 102 may be a central processing unit (CPU), and device 104 may be a chipset. Accordingly, interconnection medium 106 may be included in, for example, a bus interface. The embodiments, however, are not limited to this context.

As shown in FIG. 1A, device 102 includes an output terminal 112 that is coupled to interconnection medium 106 via a pad 108. Also, device 104 includes an input terminal 114 that is coupled to interconnection medium 106 via a pad 110.

Interconnection medium 106 provides for the transfer of electrical signals. For instance, interconnection medium 106 may allow device 102 to send a logical signal to a receiving circuit (not shown) within device 104. As described above, interconnection medium 106 may be included in a bus interface. For example, interconnection medium 106 may be a line within a computer system front side bus (FSB) or processor bus.

FIG. 1A shows that device 102 may include a driver module 116, a resistance 118, a diode 120, and a diode 122. Driver module 116 is coupled between a ground node and output terminal 112. Resistance 118 is coupled between output terminal 112 and a node 123 (also shown in FIG. 1A as $V_{TT}$ rail). FIG. 1A further shows a voltage source $V_{TT}$, which is coupled to node 123. In addition, a capacitance 124 is shown, which is coupled between node 123 and a ground node.

Driver module 116 is shown as a solid state device that may provide for a current through resistance 118 when it receives an appropriate signal at its terminal 117. The presence or absence of such a current causes the voltage of output terminal 112 to drop or rise, correspondingly. Therefore, in this manner, driver module 116 may provide signaling across interconnection medium 106. Although FIG. 1A shows driver module 116 as a single element, it may be implemented with multiple elements in various forms and/or arrangements.

Diodes 120 and 122 are arranged in a manner to provide device 104 with electrostatic discharge (ESD) protection. As shown in FIG. 1A, diode 120 is coupled between a ground node and output terminal 112, and diode 122 is coupled between output terminal 112 and node 123.

As described above, device 104 is also connected to interconnection medium 106. In particular, device 104 provides a termination for interconnection medium 106. FIG. 1A shows that this termination includes a pull-up resistance 126. This resistance is coupled between input terminal 114 and $V_{TT}$. In embodiments, resistance 126 may have a value that is impedance matched with interconnection medium 106. However, the embodiments are not so limited.

During operation, device 102 may enter one or more various low power states in which device 102 is disconnected from its voltage supply $V_{TT}$. For example, in embodiments where device 102 is a processor, it may enter into an operational state called the C6 state. Upon entry into this state, the processor flushes all of its cache contents into a dynamic random access memory (DRAM) and removes power to its core. This core power represents a substantial portion of a computer system's energy consumption.

However, despite being disconnected from its power supply, the processor may consume power in one or more of its interface components (e.g., in its I/O ring). For example, pull-up resistances (such as resistance 126) may be provided by remote devices such as chipsets. Unless power is also removed to such pull-up resistances, electrical current may be drawn through one or more portions of the processor. This can unfortunately diminish the power savings benefits of states, such as the C6 state.

Referring again to FIG. 1A, an electrical current 128 is shown that may occur when device 102 is disconnected from power supply $V_{TT}$. As shown in FIG. 1A, this current may be drawn through resistance 126, across interconnection medium 106, and through portions of device 102. Thus, despite its occurrence during a low power state, current 124 allows the dissipation of power by elements such as resistance 126.

Figure 1B:
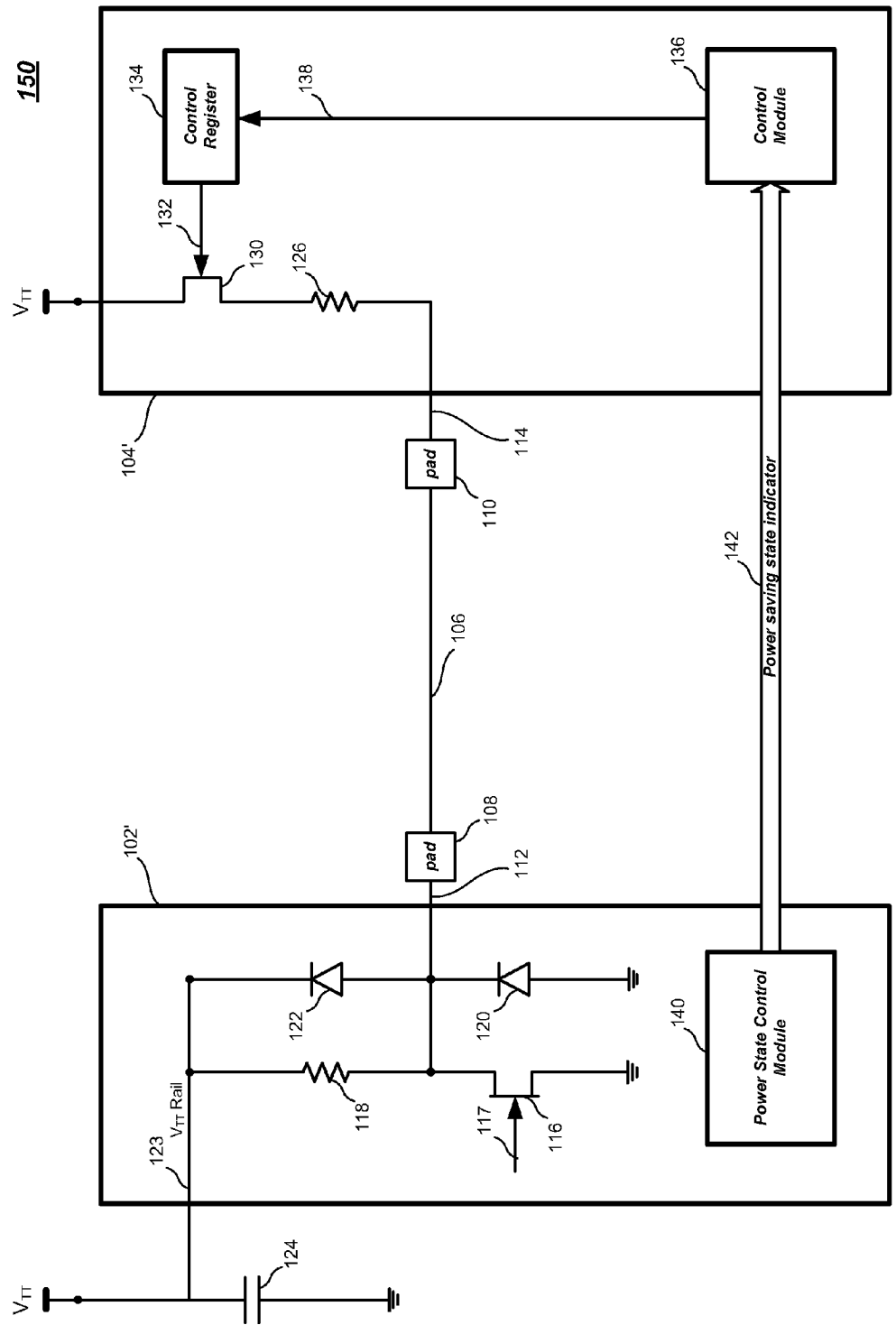

FIG. 1B shows a further embodiment of an apparatus that may transfer signals across an interconnection medium. In particular, FIG. 1B shows an apparatus 150, which is similar to apparatus 100 of FIG. 1A. Instead of including device 104, however, devices 102 and 104 are replaced with devices 102' and 104'.

FIG. 1B shows device 102' having the elements of device 102 as well as a power state control module 140. Module 140 may control the entry of device 102' into various power states (e.g., power state C6). This may be performed, for example, in response to various signals or messages that device 102' receives. In addition, entry into such power states may be in response to recent operating conditions of device 102'.

FIG. 1B shows that device 104' (which is similar to device 104) includes further elements. These elements include a switching module 130, a control register 134, and a control module 136. Switching module 130, which is coupled between resistance 126 and voltage supply $V_{TT}$, may control whether pull-up resistance 126 is coupled to $V_{TT}$. For example, switching module 130 may disconnect pull-up resistance 126 from $V_{TT}$ based on a control signal 132. Switching module 130 may be implemented with one or more circuit elements (e.g., transistors).

As shown in FIG. 1B, control signal 130 may be received from control register 134. This control register may store a value (e.g., a bit) that implements control signal 130. The contents of control register 130 may be determined by control module 136. Control module 136 may be implemented in various ways. For example, in embodiments, control module 136 is a microcontroller.

Control module 136 configures control register 134 for the disconnection of resistance 126 from $V_{TT}$ upon the receipt of a power saving state indicator 142 from power state control module 140 of device 102'. Indicator 142 may inform device 104' that device 102' has (or will be) entering a power savings state (e.g., state C6). In embodiments, power saving state indicator 142 is sent from device 102' to device 104' across a bus interface (e.g., a front side bus or processor bus).

Thus, upon entering power saving state(s), such as C6 state, pull-up resistance 126 may be disconnected from its power supply. This may occur on or after receipt of power saving state indicator 140. As described above, such features advantageously reduce power consumption and heat dissipation.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 2:
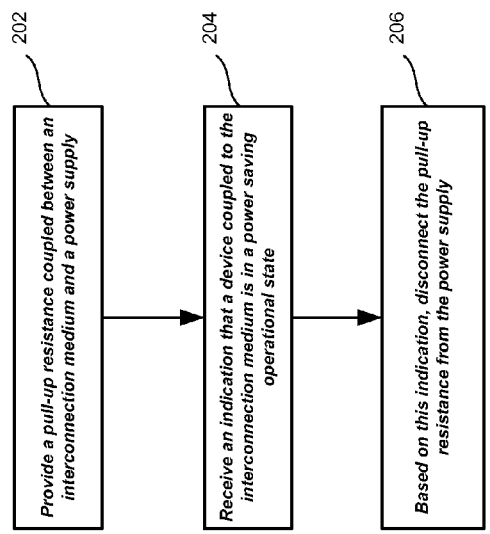
FIG. 2 illustrates one embodiment of a logic diagram.

FIG. 2 illustrates one embodiment of a logic flow. In particular, FIG. 2 illustrates a logic flow 200, which may be representative of the operations executed by one or more embodiments described herein. As shown in logic flow 200, a block 202 provides a pull-up resistance coupled between an interconnection medium and a power supply. For example, with reference to FIG. 1B, this block may be implemented by device 104'.

A block 204 receives an indication that a device coupled to the interconnection medium (e.g., device 102' of FIG. 1B) is in a power saving operational state, such as state C6. This indication may be implemented as power saving state indicator 142 of FIG. 1B.

Based on this indication, a block 206 disconnects the pull-up resistance from the power source. In the context of FIG. 1B, this may involve switching module 130 operating in response to information stored in control register 134. As described above, control module 136 may determine this information.

Figure 3:
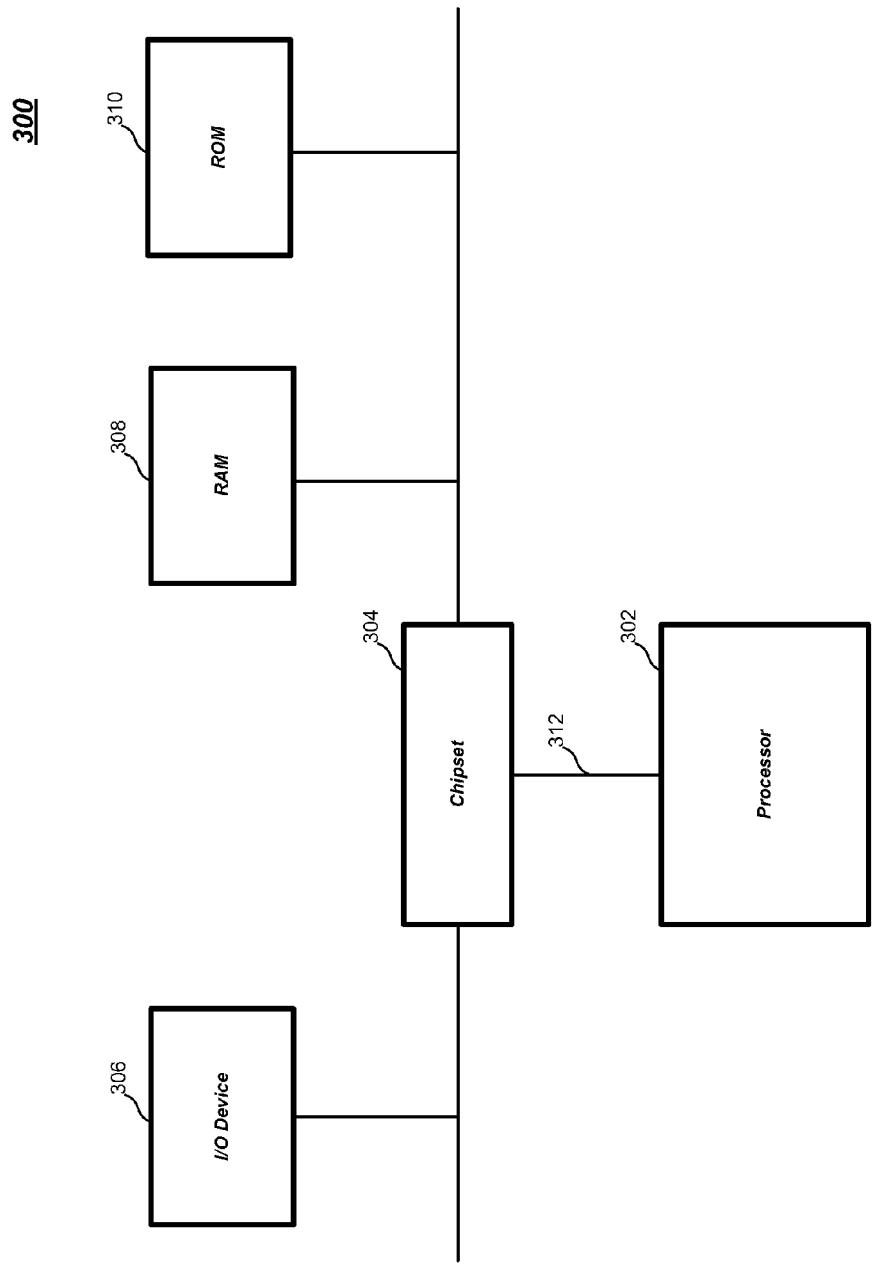
FIG. 3 illustrates an exemplary system.

FIG. 3 is a diagram of an exemplary system embodiment. In particular, FIG. 3 is a diagram showing a system 300, which may include various elements. For instance, FIG. 3 shows that system 300 may include a processor 302, a chipset 304, an input/output (I/O) device 306, a random access memory (RAM) 308, and a read only memory (ROM) 310. These elements may be implemented in hardware, software, firmware, or any combination thereof. The embodiments, however, are not limited to these elements.

As shown in FIG. 3, I/O device 306, RAM 308, and ROM 310 are coupled to processor 302 by way of chipset 304. Chipset 304 may be coupled to processor 302 by a bus 312. Accordingly, bus 312 may include multiple lines. These lines may be driven by one or more entities such as an apparatus 102' for each line. However, for such implementations, each apparatus 102' may not include a power state control module 140. Instead, processor 302 may include a single power control module 140. The embodiments, however, are not limited as such.

Processor 302 may be a central processing unit comprising one or more cores. Accordingly, processor 302 may enter into various operational states, such as one or more power saving states. Thus, processor 302 may include a power state control module 140 to facilitate or control entry into such states. Also, the power state control module 140 may provide any indication to chipset 304 (e.g., across bus 312) of entry into a low power state (e.g., state C6).

Also, these lines may be terminated for the reception of driven signals. For example, chipset 304 may provide for the termination of signal lines in bus 312 according to the techniques described herein. For instance, chipset 304 may include a pull-up resistance 126 and a switching module 130 for each signal line. In addition, chipset 304 may include a control module 136 and a control register 134 for the control of the switching modules 130.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   an interconnection medium;
   a first device to drive the interconnection medium; and
   a second device coupled to the interconnection medium, wherein the second device is to disconnect a power source from the interconnection medium when the first device is in a power saving operational state, and otherwise to couple the power source to the interconnection medium through a pull-up resistance;
   wherein the first device includes a control module to control entry of the first device into one or more operational states and to indicate the power saving operational state to the second device.

2. The apparatus of claim 1, wherein the first device is a central processing unit and the second device is included in a chipset.

3. The apparatus of claim 1, wherein the interconnection medium is included in a bus interface.

4. The apparatus of claim 1, wherein the first device is to indicate the power saving operational state to the second device, and based on this indication, the second device is to disconnect the pull-up resistance from the power source.

5. The apparatus of claim 1, wherein the second device includes a switching module, the switching module to selectively couple the pull-up resistance to the power source.

6. The apparatus of claim 5, wherein the second device includes a register, the register to store information indicating whether the switching module is to couple the pull-up resistance to the power source, and whether the switching module is to disconnect the pull-up resistance to the power source.

7. The apparatus of claim 1, wherein the power saving operational state is a C6 state.

8. The apparatus of claim 1, wherein the one or more operational states including the power saving operational state.

9. A method, comprising:
   providing a pull-up resistance coupled between an interconnection medium and a power source;
   receiving an indication from a control module of a device coupled to the interconnection medium, the indication indicating that the device is in a power saving operational state, wherein the control module to control entry of the device into one or more operation states; and
   based on this indication, disconnecting the pull-up resistance from the power source.

10. The method of claim 9, wherein the indication indicates that the power saving operational state is a C6 state.

11. The method of claim 9, further comprising storing information in a register indicating that the pull-up resistance is to be disconnected from the power source.

12. The method of claim 9, wherein the interconnection medium is included in a bus interface.

13. The method of claim 12, wherein receiving the indication comprises receiving the indication from the device through the bus interface.

14. An apparatus, comprising:
- a pull-up resistance;
- a switching module to selectively couple the pull-up resistance between an interconnection medium and a power supply, the selective coupling based on an operating condition of a device coupled to the interconnection medium; and
- a control module to cause the switching module to disconnect the power supply from the pull-up resistance based on an indication received from a power state control module of the device coupled to the interconnection medium that the device is in a power saving operational state, wherein the power state control module to control entry of the device into one or more operational states.

15. The apparatus of claim 14, wherein the device includes a driver module to drive the interconnection medium.

16. The apparatus of claim 14, wherein the device is a central processing unit.

17. The apparatus of claim 14, wherein the interconnection medium is included in a bus interface.

18. A system, comprising;
- a bus interface comprising a plurality of signal lines,
- a first device coupled to the bus interface, the first device to drive each of the signal lines;
- a second device coupled to the bus interface, wherein for each of the signal lines the second device is to disconnect a power source from the corresponding signal line when the first device is in a power saving operational state, and otherwise to couple the power source to the corresponding signal line through a pull-up resistance;
- wherein the first device includes a control module to control entry of the first device into one or more operational states and to indicate the power saving operational state to the second device.

19. The system of claim 18, wherein the first device is a central processing unit (CPU) and the second device is included in a chipset.

* * * * *